US010996906B2

(12) United States Patent
Iwasaki

(10) Patent No.: US 10,996,906 B2
(45) Date of Patent: May 4, 2021

(54) IMAGE PROCESSING APPARATUS THAT IS CONNECTABLE WITH INFORMATION PROCESSING APPARATUS PROVIDING SERVICE TO IMAGE PROCESSING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Shin Iwasaki, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/274,536

(22) Filed: Feb. 13, 2019

(65) Prior Publication Data
US 2019/0258432 A1 Aug. 22, 2019

(30) Foreign Application Priority Data

Feb. 21, 2018 (JP) .............................. JP2018-028879
Nov. 9, 2018 (JP) .............................. JP2018-211554

(51) Int. Cl.
G06F 3/12 (2006.01)
G06F 11/22 (2006.01)
(Continued)

(52) U.S. Cl.
CPC .......... *G06F 3/1235* (2013.01); *G06F 3/0482* (2013.01); *G06F 3/121* (2013.01); *G06F 9/542* (2013.01)

(58) Field of Classification Search
USPC ...... 358/1.1–3.29, 1.11–1.18, 504, 405, 406; 380/2, 230, 250; 398/1, 9, 106;
(Continued)

(56) References Cited

U.S. PATENT DOCUMENTS 7,061,634 B1* 6/2006 Ogura ................ G03G 15/5079
358/1.15
8,082,323 B2* 12/2011 Yamaguchi ............. G06F 21/31
358/1.15
(Continued)

FOREIGN PATENT DOCUMENTS

JP 2007328641 A 12/2007

*Primary Examiner* — Marcellus J Augustin
(74) *Attorney, Agent, or Firm* — Rossi, Kims & McDowell LLP

(57) ABSTRACT

An image processing apparatus that is capable of requesting maintenance in a stage of an error sign. The image processing apparatus is connectable with an information processing apparatus providing service to the image processing apparatus. A detection unit detects an error sign occurred in the image processing apparatus. A display control unit controls so as to display a notification screen about the error sign detected by the detection unit on a display unit of the image processing apparatus. The display control unit controls display so that the notification screen is displayed on the display unit in a case where a contract of receiving service from the information processing apparatus is invalid. And the display control unit controls the display so that the notification screen is not displayed on the display unit in a case where the contract is valid.

9 Claims, 13 Drawing Sheets

(51) Int. Cl.
*G06F 3/0482* (2013.01)
*G06F 9/54* (2006.01)

(58) Field of Classification Search
USPC .................................. 399/8–37, 42, 75–82
See application file for complete search history.

(56) References Cited

U.S. PATENT DOCUMENTS

| | | | |
|---|---|---|---|
| 2011/0099272 A1* | 4/2011 | Takahashi | G06F 11/0733 709/224 |
| 2013/0114100 A1* | 5/2013 | Torii | G06F 11/0733 358/1.14 |
| 2017/0090830 A1* | 3/2017 | Tomono | G06F 3/1235 |
| 2018/0084142 A1* | 3/2018 | Kamoi | H04N 1/32122 |

* cited by examiner

IMAGE PROCESSING APPARATUS THAT IS CONNECTABLE WITH INFORMATION PROCESSING APPARATUS PROVIDING SERVICE TO IMAGE PROCESSING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus that is connectable with an image processing apparatus providing service to the image processing apparatus, a control method therefor, and a storage medium storing a control program therefor.

Description of the Related Art

There is a known image processing apparatus that performs self-diagnostics for detecting errors, such as operational abnormalities and failures of mounted parts. The image processing apparatus displays a warning notice including a message that prompts contact with a service department in charge of the above-mentioned image processing apparatus on a display unit of the apparatus when a serious error that a user cannot repair occurs. When ascertaining the above-mentioned warning notice, the user requests the service department in charge of the image processing apparatus to repair the apparatus.

Moreover, a remote monitoring service may be used as a method to request maintenance from the allotted service department before occurrence of an error in the image processing apparatus. In the remote monitoring service, a monitoring server that is managed by a sales company of the image processing apparatus monitors a sign (hereinafter referred to as an "error sign") that is an occurrence factor of an error of the image processing apparatus after obtaining a user's approval. For example, when an error sign occurs in the image processing apparatus that is connected to the monitoring server, maintenance is requested from the allotted service department via the monitoring server without displaying the warning notice on the display unit of the image processing apparatus (for example, see Japanese Laid-Open Patent Publication (Kokai) No. 2007-328641 (JP 2007-328641A)). Thereby, the maintenance of the image processing apparatus is performed in the stage of the error sign.

However, the conventional monitoring server cannot detect an error sign occurred in an image processing apparatus that is in a state where communication with the monitoring server concerned is unavailable. Accordingly, when an error sign occurs in the image processing apparatus that is incommunicable with the monitoring server, the maintenance cannot be requested in the stage of the error sign.

SUMMARY OF THE INVENTION

The present invention provides an image processing apparatus, a control method therefor, and a storage medium storing a control program therefor, which are capable of requesting maintenance in a stage of an error sign.

Accordingly, a first aspect of the present invention provides an image processing apparatus that is connectable with an information processing apparatus providing service to the image processing apparatus, the image processing apparatus including a detection unit configured to detect an error sign occurred in the image processing apparatus, and a display control unit configured to control so as to display a notification screen about the error sign detected by the detection unit on a display unit of the image processing apparatus. The display control unit controls display so that the notification screen about the error sign is displayed on the display unit in a case where a contract of receiving service from the information processing apparatus is invalid. And the display control unit controls the display so that the notification screen about the error sign is not displayed on the display unit in a case where the contract of receiving service from the information processing apparatus is valid.

Accordingly, a second aspect of the present invention provides a control method for an image processing apparatus that is connectable with an information processing apparatus providing service to the image processing apparatus, the control method including a detection step of detecting an error sign occurred in the image processing apparatus, and a display control step of controlling display so as to display a notification screen about the error sign detected in the detection step on a display unit of the image processing apparatus. The display is controlled so that the notification screen about the error sign is displayed on the display unit in the display control step in a case where a contract of receiving service from the information processing apparatus is invalid. And the display is controlled so that the notification screen about the error sign is not displayed on the display unit in the display control step in a case where the contract of receiving service from the information processing apparatus is valid.

Accordingly, a third aspect of the present invention provides a non-transitory computer-readable storage medium storing a control program causing a computer to execute the control method of the second aspect.

According to the present invention, the maintenance can be requested in the stage of an error sign.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings. Although the embodiment describes the case where the present invention is applied to an MFP as an image processing apparatus monitored by a monitoring server, an applied target of the present invention is not limited to an MFP. For example, the present invention may be applied to devices, such as a mobile terminal and a client PC that are communicable with a monitoring server.

Figure 1:
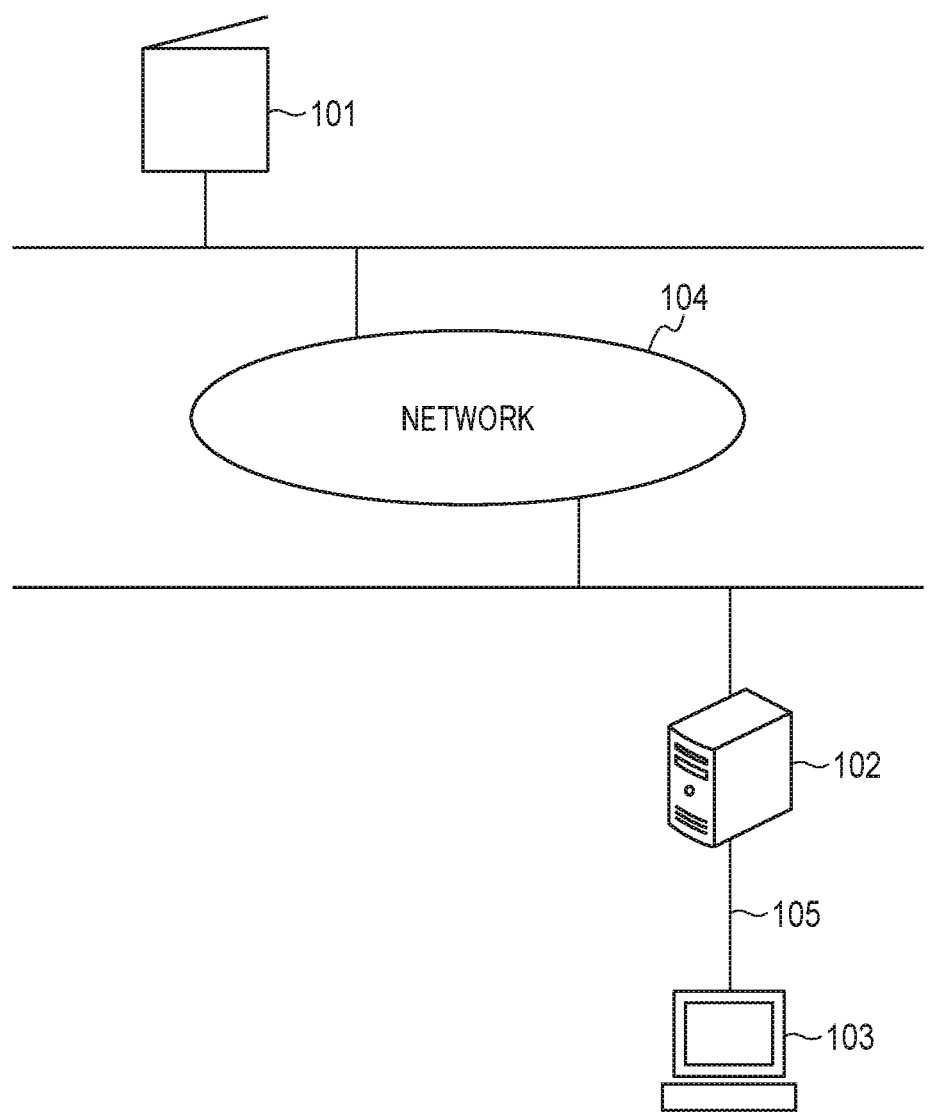
FIG. 1 is a network diagram schematically showing a configuration of a communication system including an MFP as an image processing apparatus according to an embodiment of the present invention.

FIG. 1 is a network diagram schematically showing a configuration of a communication system 100 including an MFP 101 as the image processing apparatus according to the embodiment of the present invention. As shown in FIG. 1, the communication system 100 are provided with the MFP 101, a monitoring server 102 as a monitoring apparatus (an information processing apparatus), and a service-dispatch management server 103. The MFP 101 and the monitoring server 102 are connected through a network 104. The monitoring server 102 and the service-dispatch management server 103 are connected through a LAN 105.

The MFP 101 receives PDL data from an external apparatus (not shown) connected through the network 104 and prints according to the received PDL data. Moreover, the MFP 101 reads an original arranged with a scanner 308 shown in FIG. 3 mentioned later and generates image data. In the MFP 101, when support registration is performed using a support registration screen 600 in FIG. 6 mentioned later aside from a maintenance contract of the MFP 101, a contract of receiving service from the monitoring server 102 becomes valid, and remote monitoring service is activated. In the remote monitoring service, the monitoring server 102 monitors a generation situation of a predetermined phenomenon in the MFP, which is an alert related to abnormality of the MFP 101 (hereinafter referred to as an "abnormality-related alert") specifically. When the abnormality-related alert occurs in the MFP 101 after activating the remote monitoring service, the MFP 101 sends alert information including a content of the above-mentioned abnormality-related alert to the monitoring server 102. The monitoring server 102 monitors the generation situation of the abnormality-related alert in the apparatus that the support registration has been performed. For example, when receiving alert information including the content of the abnormality-related alert from the MFP 101, the monitoring server 102 detects the occurrence of the alert in the MFP 101 on the basis of the above-mentioned alert information and sends a dispatch request of a service person who repairs the MFP 101 to the service-dispatch management server 103. The service-dispatch management server 103 arranges a service person according to the dispatch request received from the monitoring server 102.

Figure 2:
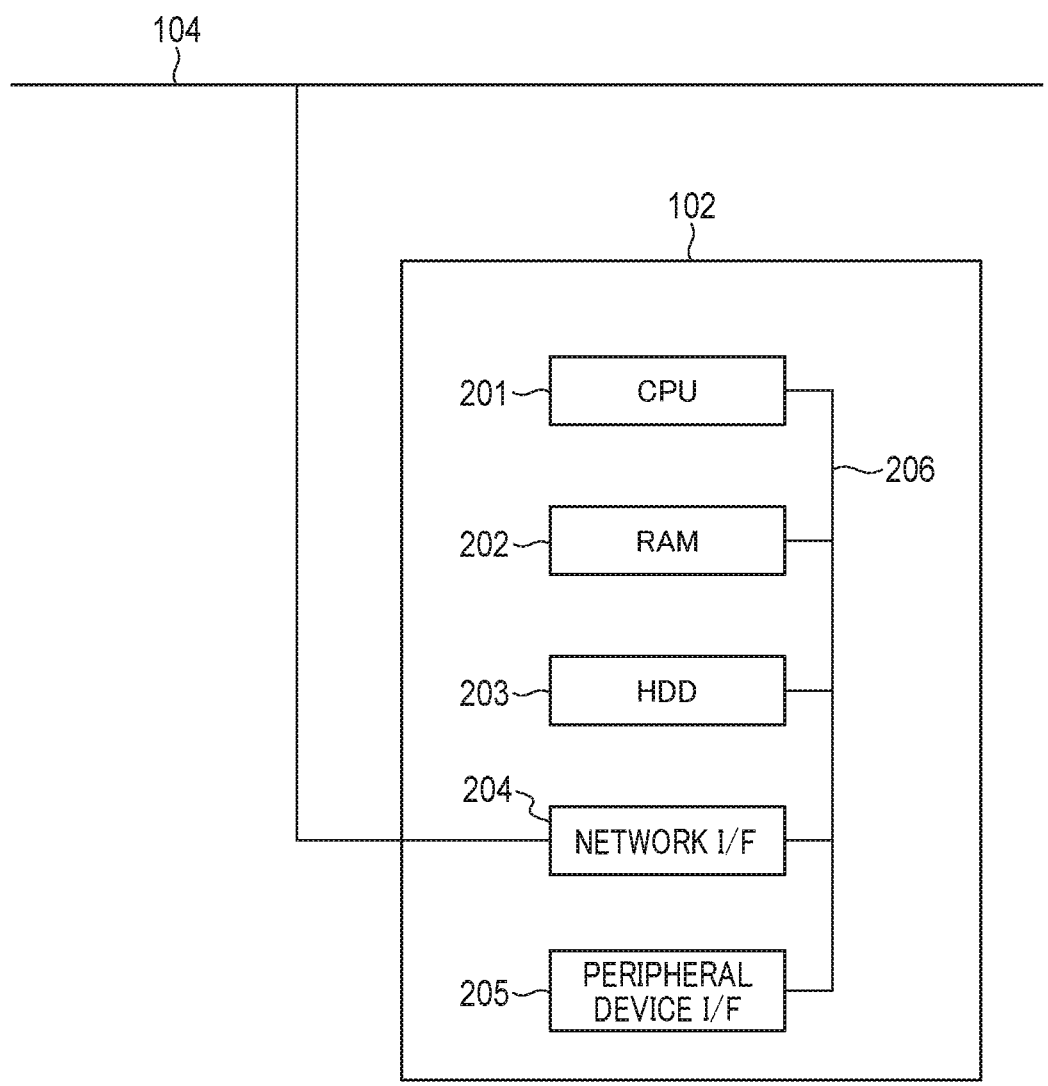
FIG. 2 is a block diagram schematically showing a configuration of a monitoring server shown in FIG. 1.

FIG. 2 is a block diagram schematically showing the configuration of the monitoring server 102 shown in FIG. 1. As shown in FIG. 2, the monitoring server 102 is provided with a CPU 201, a RAM 202, an HDD 203, a network I/F 204, and a peripheral device I/F 205. The CPU 201, RAM 202, HDD 203, network I/F 204, and peripheral device I/F 205 are mutually connected through a system bus 206.

The CPU 201 integrally controls the entire monitoring server 102. The CPU 201 develops a program read from the HDD 203 to the RAM 202 and runs the program developed to the RAM 202. The HDD 203 stores a program executed by the CPU 201. The RAM 202 is used as a working area of the CPU 201 and is used as a temporary storage area for data. The network I/F 204 performs data communication with an external apparatus like the MFP 101 connected through the network 104. Moreover, the network I/F 204 performs data communication with the service-dispatch management server 103 connected through the LAN 105. The peripheral device I/F 205 is an interface for connecting peripheral devices (not shown), such as a display unit and a keyboard, to the monitoring server 102. The monitoring server 102 outputs information to a user and receives an instruction from a user by controlling the peripheral devices connected to the peripheral device I/F 205.

Figure 3:
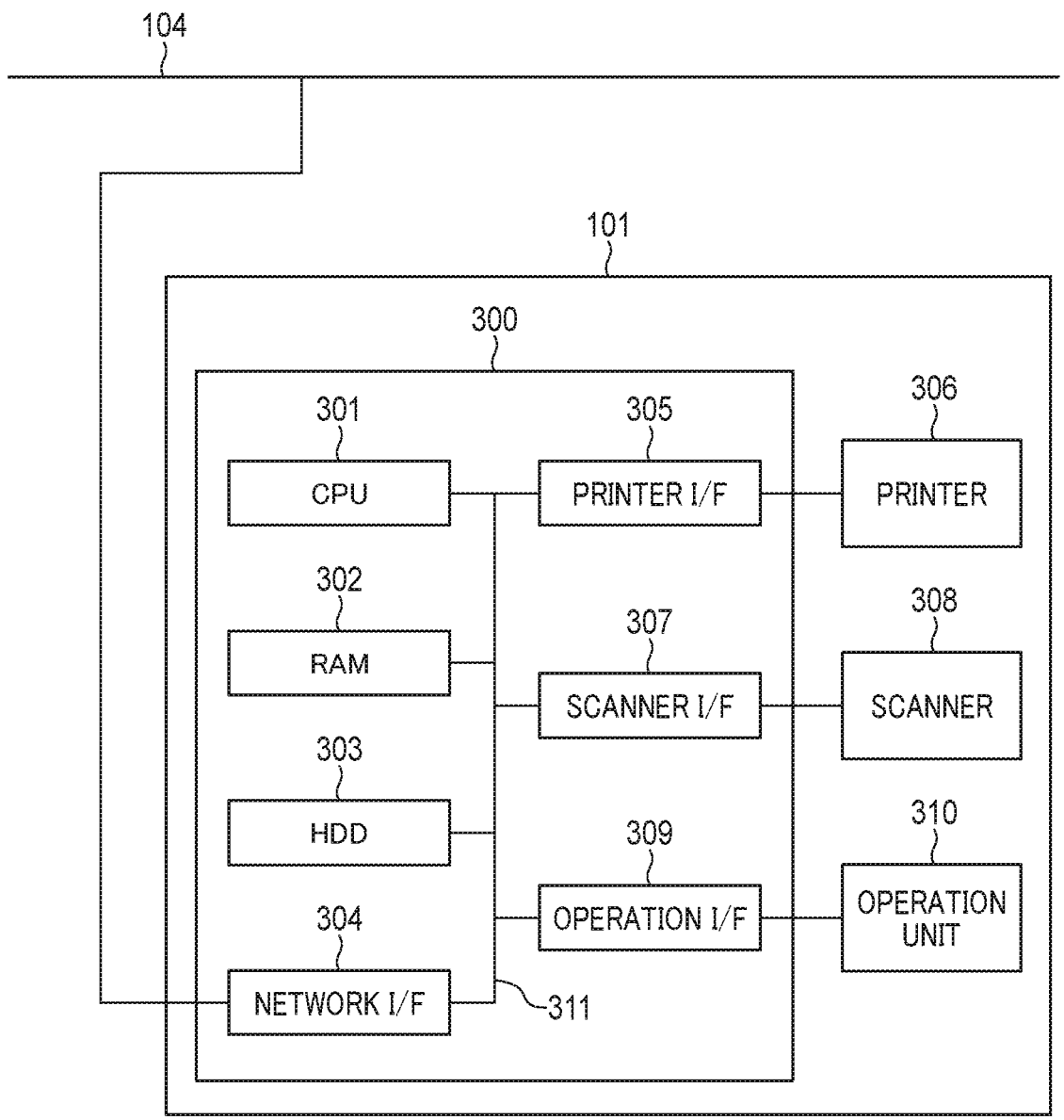
FIG. 3 is a block diagram schematically showing the configuration of the MFP shown in FIG. 1.

FIG. 3 is a block diagram schematically showing the configuration of the MFP 101 shown in FIG. 1. The MFP 101 is provided with a controller 300, a printer 306, the scanner 308, and an operation unit 310. The controller 300 is connected with the printer 306, the scanner 308, and the operation unit 310. Moreover, the controller 300 is provided with a CPU 301, a RAM 302, an HDD 303, a network I/F 304, a printer I/F 305, a scanner I/F 307, and an operation I/F 309. The CPU 301, RAM 302, HDD 303, network I/F 304, printer I/F 305, scanner I/F 307, and operation I/F 309 are mutually connected via a system bus 311.

The controller 300 integrally controls the entire MFP 101. The CPU 301 develops a program read from the HDD 303 to the RAM 302 and runs the program developed to the RAM 302. The RAM 302 is used as a working area of the CPU 301, and is used as a temporary storage area for data. The HDD 303 stores a program that the CPU 301 runs, various setting values of the MFP 101 data about a process requested by a user, and data received from the external apparatus, etc. The network I/F 304 performs data communication with an external apparatus like the monitoring server 102 connected through the network 104.

The printer I/F 305 is an interface for connecting the controller 300 and the printer 306. For example, the printer I/F 305 transfers the image data sent from the CPU 301 to the printer 306. Moreover, the printer IT 305 transfers status information about the printer 306 received from the printer 306 concerned to the CPU 301. The printer 306 prints the image data received from printer I/F 305 on a sheet. Moreover, the printer 306 outputs the status information about printer 306 concerned to the printer I/F 305.

The scanner I/F 307 is an interface for connecting the controller 300 and the scanner 308. For example, the scanner IT 307 transfers an image-reading instruction sent from the CPU 301 to the scanner 308. Moreover, the scanner IT 307 transfers the image data received from the scanner 308 to the CPU 301. Furthermore, the scanner I/F 307 transfers the status information about the scanner 308 received from the scanner 308 concerned to the CPU 301. The scanner 308 reads an original arranged according to the image-reading instruction received from the scanner I/F 307 and outputs digital data of the read information to the scanner I/F 307. Moreover, the scanner 308 outputs the status information about the scanner 308 concerned to the scanner IT 307.

The operation I/F 309 outputs the content of the instruction that the user has input through the operation unit 310 to the CPU 301. Moreover, the operation I/F 309 controls the display of the screen of the operation unit 310 according to a control signal received from the CPU 301. The operation unit 310 is a user interface of the MFP 101. The operation unit 310 is provided with a display unit 401, a start key 402, a ten-key pad 403, and a stop key 404 as shown in FIG. 4.

Figure 5:
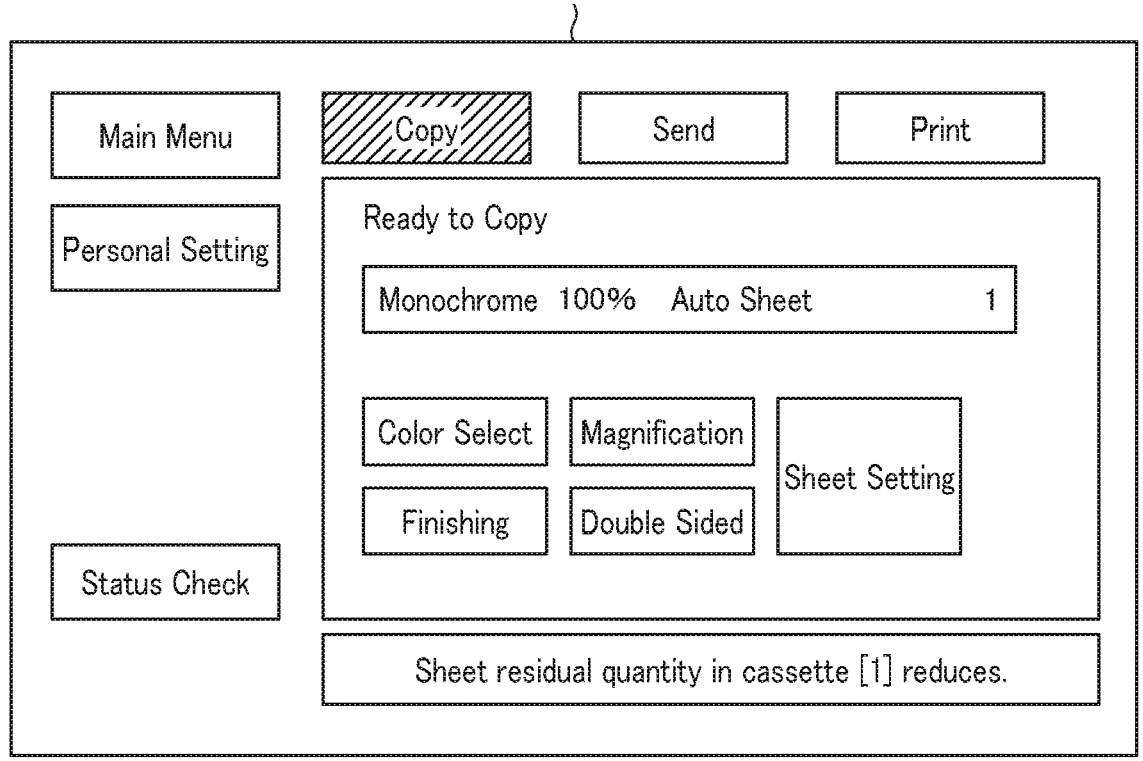
FIG. 5 is a view showing an example of a setting screen displayed on a display unit shown in FIG. 4.

The display unit 401 consists of an LCD and a touch panel sheet that covers a surface of the LCD. The display unit 401 displays various setting screens including soft keys (a setting screen 500 in FIG. 5, for example) and sends position information indicating a pressed position to the CPU 201 when a user presses a displayed soft key. The start key 402 is used, for example, when a user instructs the MFP 101 to start an original reading operation. A red LED and a green LED are provided in the center of the start key 402. Lighting of the red LED indicates that the start key is unavailable and lighting of the green LED indicates that the start key is available. The ten-key pad 403 consists of numeral buttons and character buttons and is used when a user instructs setting of print copies and switching of the screen on the display unit 401, for example. The stop key 404 is used when a user instructs the MFP 101 to stop an action under operation, for example.

Figure 4:
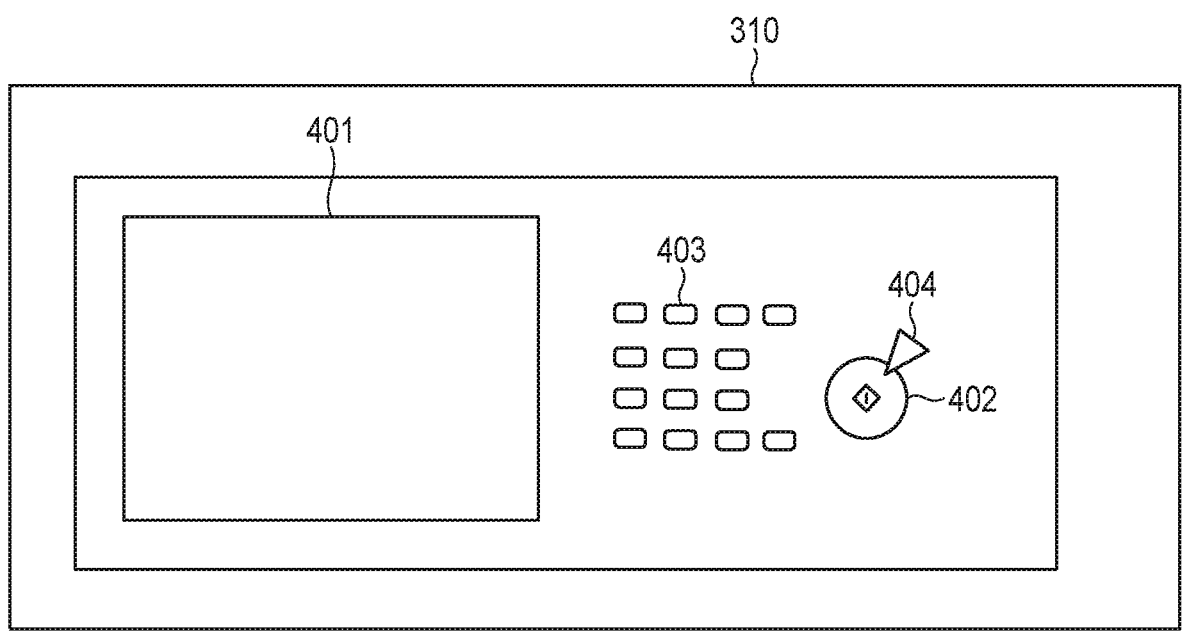
FIG. 4 is an external view of an operation unit shown in FIG. 3.
Figure 6:
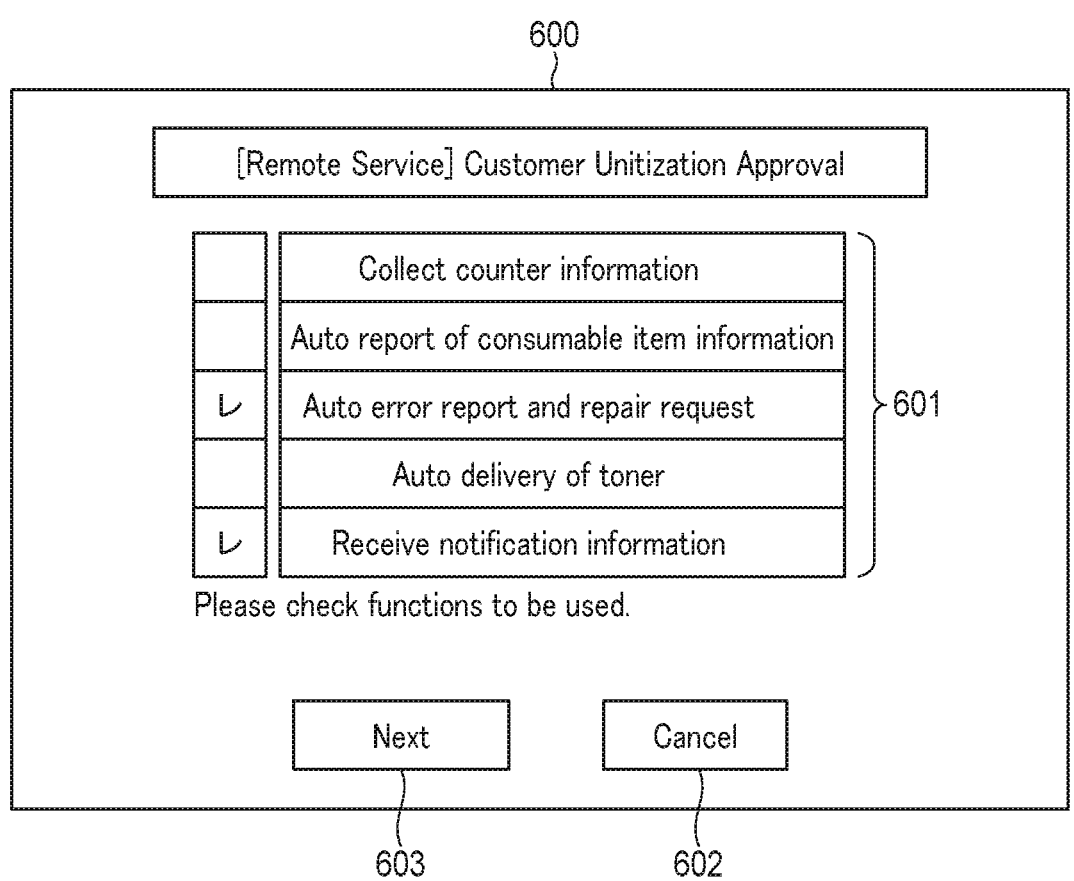
FIG. 6 is a view showing an example of a support registration screen displayed on the display unit shown in FIG. 4.
Figure 7:
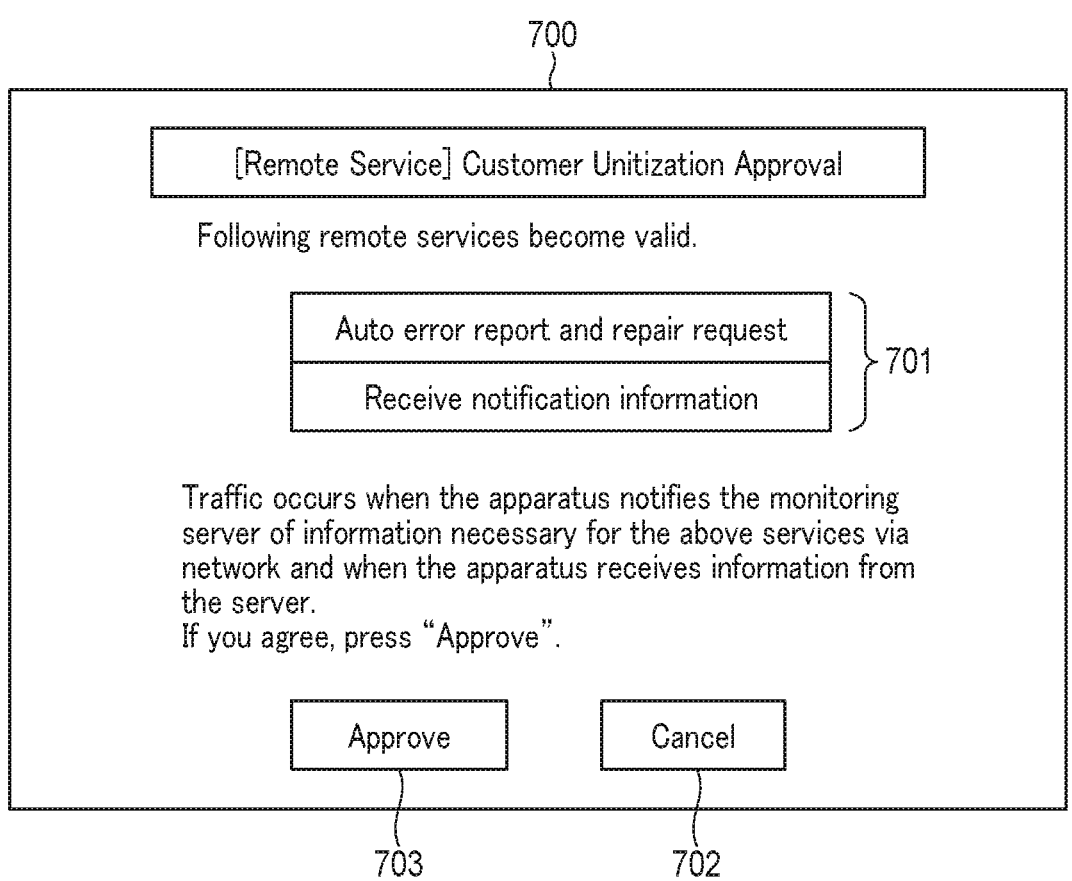
FIG. 7 is a view showing an example of an approval setting screen displayed on the display unit shown in FIG. 4.

FIG. 6 is a view showing an example of the support registration screen 600 displayed on the display unit 401 shown in FIG. 4. The support registration screen 600 is a setting screen for performing the support registration of the remote monitoring service. The support registration screen 600 includes a service list 601, a cancel button 602, and a next button 603. The service list 601 displays the services that are available in the remote monitoring service. A user is able to select desired service from the service list 601. When the cancel button 602 is pressed in the support registration screen 600, the display of the display unit 401 switches from the support registration screen 600 to another screen without activating the remote monitoring service of the MFP 101. When the next button 603 is pressed on the support registration screen 600, the display on the display unit 401 switches from the support registration screen 600 to an approval setting screen 700 in FIG. 7.

The approval setting screen 700 includes a cancel button 702 and an approval button 703. Information showing the service selected from the service list 601, cautions accompanying use of the remote monitoring service, a consent confirmation item, etc. are displayed on a display column 701 in the approval setting screen 700. When the cancel button 702 is pressed in the approval setting screen 700, the display of the display unit 401 switches from the approval setting screen 700 to another screen without activating the remote monitoring service of the MFP 101. When the approval button 703 is pressed in the approval setting screen 700, the communication setting of the monitoring server 102 showing that the MFP 101 is in a communicating state with the monitoring server 102 is set to "ON", and the remote monitoring service of the MFP 101 is activated. Thereby, when the MFP 101 causes the above-mentioned abnormality-related alert, the dispatch management server 103 arranges a service person who repairs the MFP 101 even if the user does not inquire the allotted service department (a manager, a service department in charge of repair).

Figure 8:
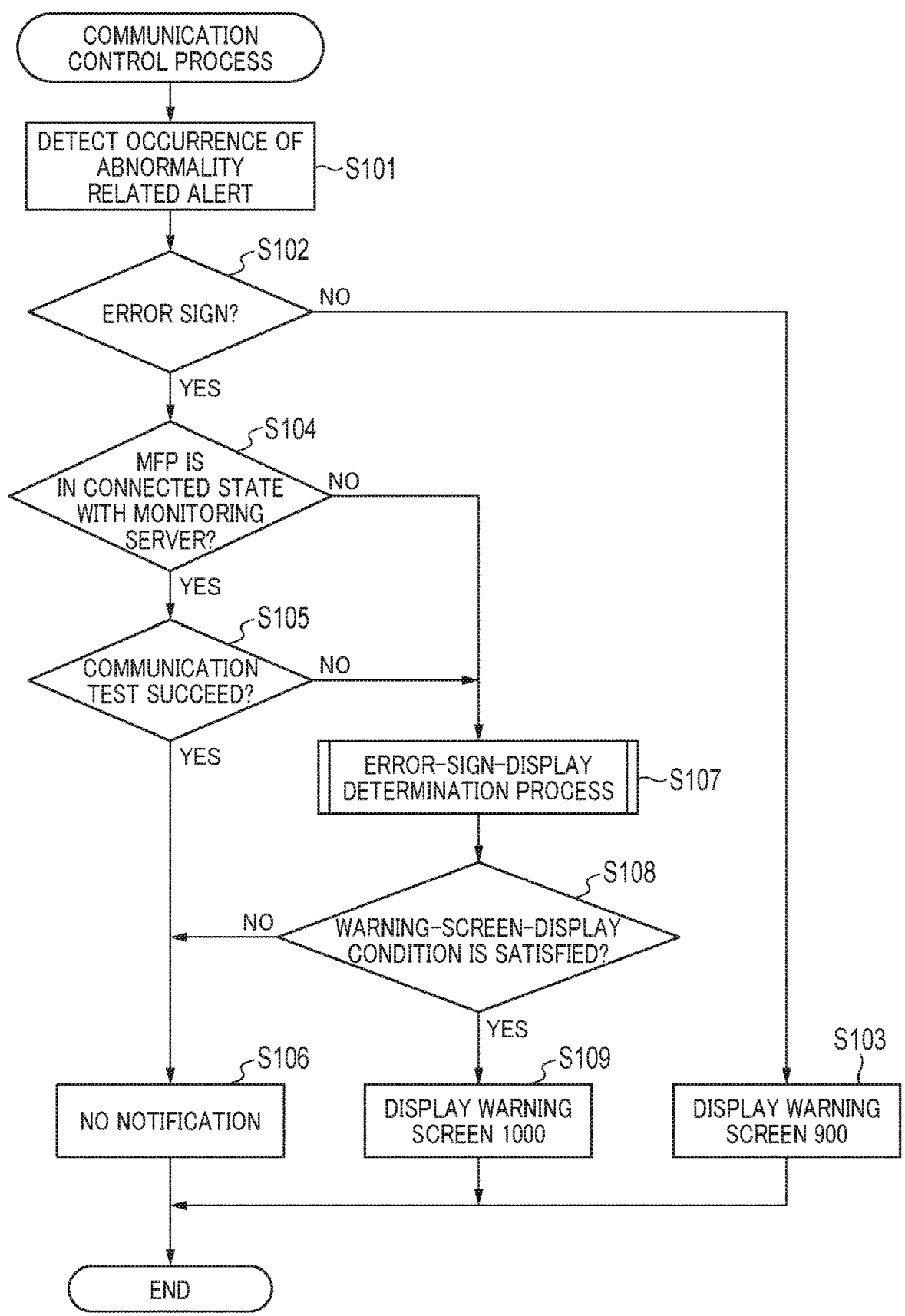
FIG. 8 is a flowchart showing procedures of a communication control process executed by the MFP shown in FIG. 1.

FIG. 8 is a flowchart showing procedures of a communication control process executed by the MFP 101 shown in FIG. 1. The process in FIG. 8 is executed when the CPU 301 runs a program stored in the HDD 303. The process in FIG. 8 is executed when the abnormality-related alert occurs in the MFP 101.

As shown in FIG. 8, the CPU 301 detects occurrence of the abnormality-related alert (step S101). Specifically, the abnormality-related alert is classified into error stop or an error sign. The error stop occurs, when the abnormality that inactivates all the functions of the MFP 101 is detected. When the error stop occurs, the user cannot use the MFP 101 until the abnormal condition is solved. The error sign is a warning that occurs during execution of each process in the MFP 101. For example, the error sign is a patch-inspection abnormality alarm that occurs during execution of an image forming process or a transfer alarm that occurs when both detected current values at two points are equal to or less than a threshold in primarily transfer ATVC (Active Transfer Voltage Control). The error sign occurs in comparatively low frequency depending on an operating condition etc. even when the MFP 101 is in a normal state. In the meantime, the error sign occurs in comparatively high frequency when the MFP 101 is not in the "error stop" state but in a state where the maintained is needed. In the stage where the error sign is detected, the user can use all the functions of the MFP 101 without restriction. In the embodiment, notification given to the user varies according to the type of the occurred abnormality-related alert. Next, the CPU 301 determines whether the type of the occurred abnormality-related alert is the "error sign" (step S102).

Figure 9:
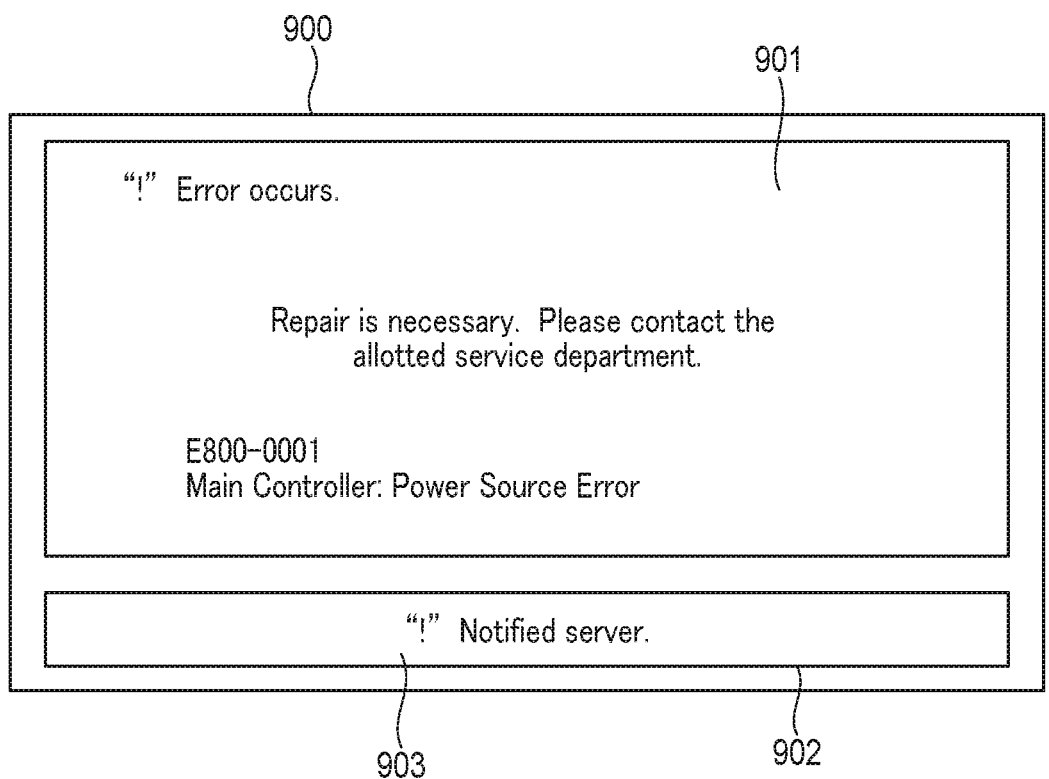
FIG. 9 is a view showing an example of a warning screen displayed on the display unit shown in FIG. 4.

As a result of the determination in the step S102, when the type of the occurred abnormality-related alert is not the "error sign", the CPU 301 determines that the type of the occurred abnormality-related alert is the "error stop". The CPU 301 displays a warning screen 900 shown in FIG. 9 on the display unit 401 as notification to the user (step S103). The warning screen 900 includes a message 901 that prompts contact with the allotted service department. Moreover, when the remote monitoring service is activated, the CPU 301 sends the alert information including the content of the abnormality-related alert and the identification ID of the MFP 101 to the monitoring server 102. At this time, a message 903 showing that the alert information has been sent to the monitoring server 102 is displayed in a status display part 902 of the warning screen 900. Thus, in the embodiment, when the abnormality that inactivates all the functions of the MFP 101 is detected, priority is given to the quick arrangement of a service person and repair is requested through the monitoring server 102. At the same time, a method that a user requests repair is also provided. Then, the CPU 301 finishes this process.

As a result of the determination in the step S102, when the type of the occurred abnormality-related alert is the "error sign", the CPU 301 determines whether the communication setting of the monitoring server 102 is "ON" (step S104).

As a result of the determination in the step S104, when the communication setting is ON, the CPU 301 determines whether the communication test of the monitoring server 102 succeeded (step S105). In the step S105 the CPU 301 determines whether the communication test that was executed at the time when the occurrence of the abnormality-related alert was detected in the step S101 succeeded, for example. Alternatively, the CPU 301 executes the determination process in the step S105 on the basis of the execution result of the communication test of the monitoring server 102 executed periodically irrespective of detection of occurrence of an abnormality-related alert.

As a result of the determination in the step S105, when the communication test of the monitoring server 102 is succeeded, the CPU 301 sends the alert information including the content of the abnormality-related alert and the identification ID of the MFP 101 to the monitoring server 102 because the communication with the monitoring server 102 is available. The monitoring server 102 requests maintenance from the service-dispatch management server 103 in order to cope with the error sign that is shown by the received alert information. Moreover, the CPU 301 does not notify the user (step S106). That is, in the embodiment, when the MFP 101 is communicable with the monitoring server 102, the maintenance about the error sign is requested through the monitoring server 102. In this case, the warning screen that prompts contact with the allotted service department is not displayed on the display unit 401. Then, the CPU 301 finishes this process.

When the communication test of the monitoring server 102 failed as a result of the determination in the step S105 or when the MFP 101 is not in the communicating state with the monitoring server 102 as a result of the determination in the step S104, the CPU 301 executes an error-sign-display determination process in FIG. 11 mentioned later (step S107). In the step S107, it is specified whether the occurred abnormality-related alert satisfies a display condition of the warning screen. Next, the CPU 301 determines whether the occurred abnormality-related alert satisfies the display condition of the warning screen on the basis of the processing result in the step S107 (step S108).

Figure 10:
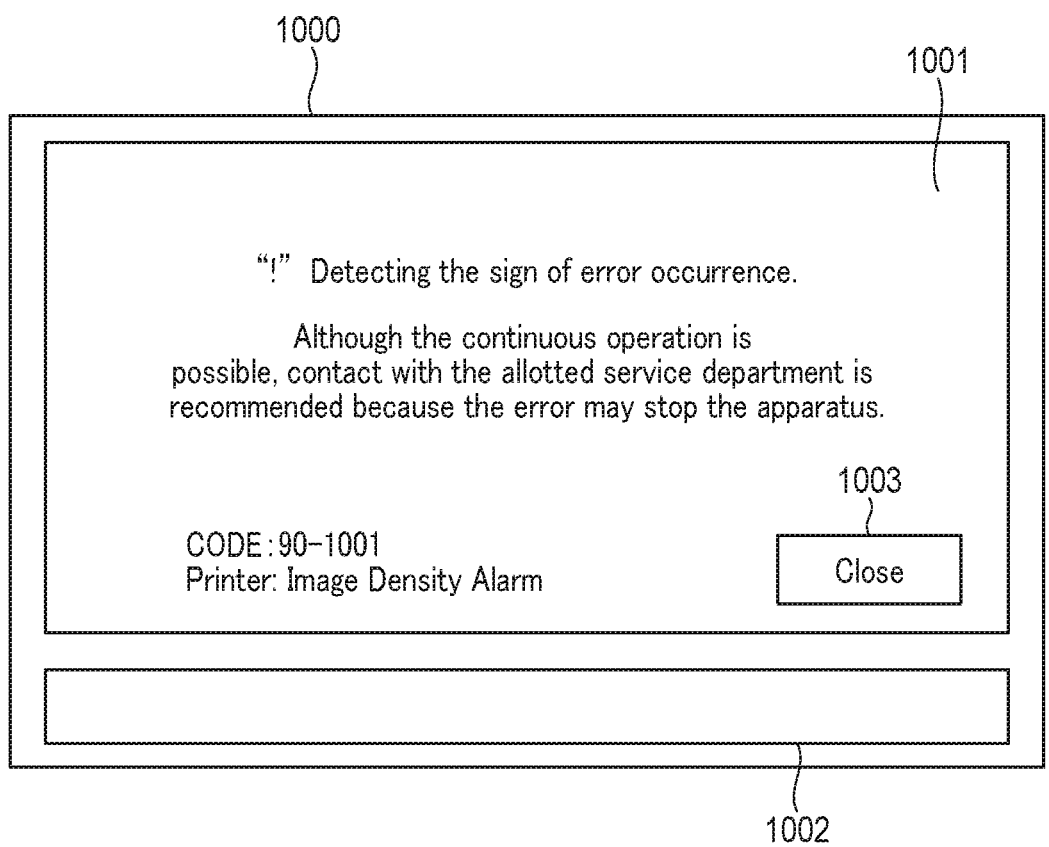
FIG. 10 is a view showing another example of the warning screen displayed on the display unit shown in FIG. 4.

As a result of the determination in the step S108, when the occurred abnormality-related alert does not satisfy the display condition of the warning screen, the CPU 301 executes the process in and after the step S106. As a result of the determination in the step S108, when the occurred abnormality-related alert satisfies the display condition of the warning screen, the CPU 301 displays a warning screen 1000 shown in FIG. 10 on the display unit 401 as notification to the user (step S109). The warning screen 1000 includes a message 1001 that prompts contact with the allotted service department. Moreover, since the CPU 301 is incommunicable with the monitoring server 102 and cannot send the alert information to the monitoring server 102, the message showing that the alert information has been sent is not displayed in a status line part 1002 of the warning screen 1000. Then, the CPU 301 finishes this process.

Figure 11:
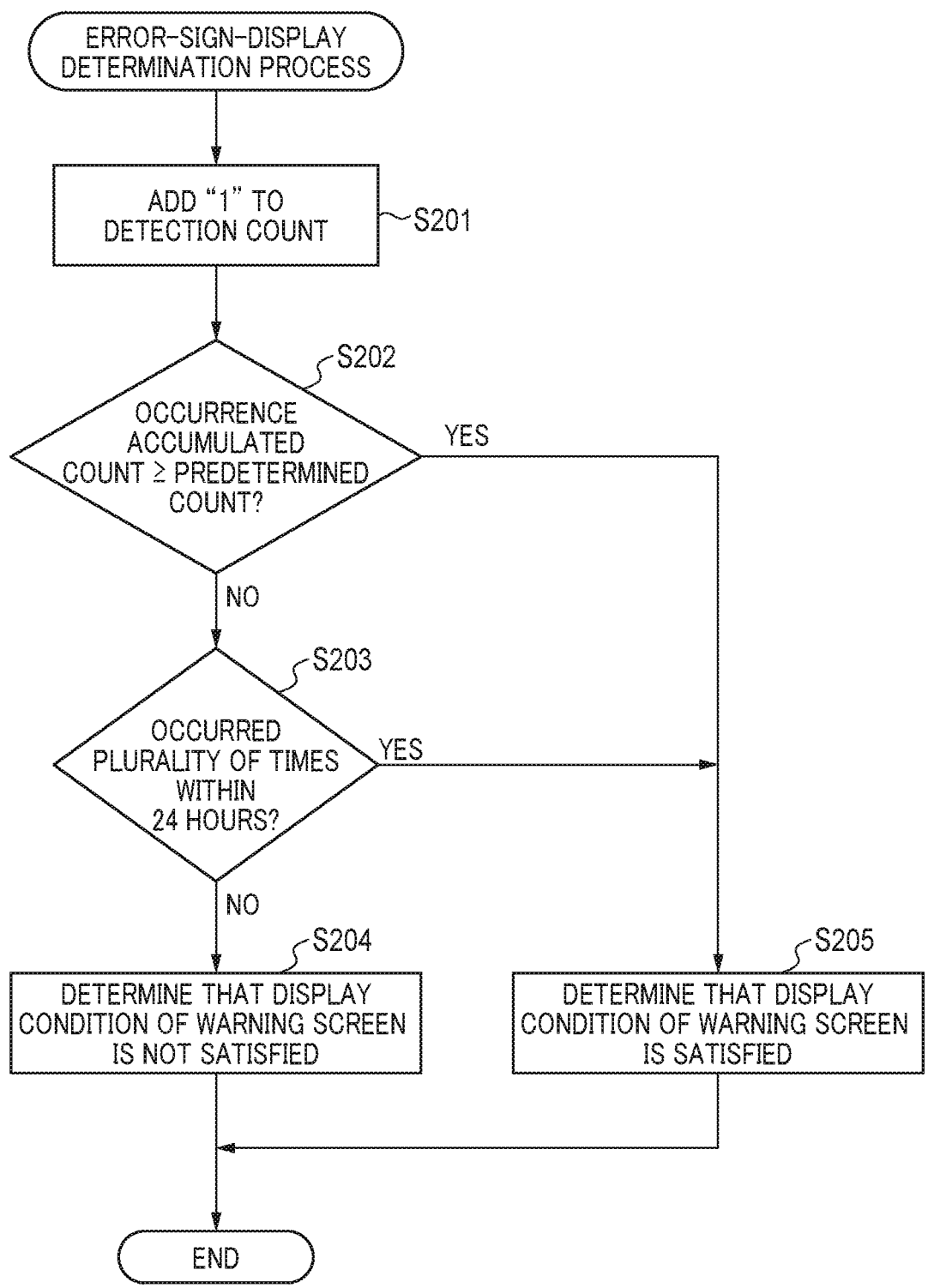
FIG. 11 is a flowchart showing procedures of an error-sign-display determination process in step S107 in FIG. 8.

FIG. 11 is a flowchart showing procedures of the error-sign-display determination process executed in the step S107 in FIG. 8.

As shown in FIG. 11, the CPU 301 add "1" to a detection count that shows the number of times of detecting the abnormality-related alert of the "error sign" (step S201). The detection count is stored in the HDD 303. Next, the CPU 301 determines whether an occurrence accumulated count of the "error sign" is equal to or more than a predetermined count (ten, for example) set beforehand (step S202).

As a result of the determination in the step S202, when the occurrence accumulated count of the "error sign" is equal to or more than the predetermined count (ten, for example), the CPU 301 determines whether the "error sign" occurred a plurality of times (three times, for example) or more within 24 hours (step S203).

As a result of the determination in the step S203, when the "error sign" did not occur a plurality of times (three times, for example) or more within 24 hours, the CPU 301 determines that the occurred abnormality-related alert does not satisfy the display condition of the warning screen (step S204). Next, the CPU 301 finishes this process and executes the process in and after the step S108.

When the occurrence accumulated count of the "error sign" is equal to or more than the predetermined count (ten, for example) as a result of the determination in the step S202 or when the "error sign" occurred a plurality of times (three times, for example) or more within 24 hours as a result of the determination in the step S203, the CPU 301 determines that the occurred abnormality-related alert satisfies the display condition of the warning screen (step S205). Next, the CPU 301 finishes this process and executes the process in and after the step S108.

According to the above-mentioned processes in FIG. 8 and FIG. 11, it is determined whether the warning screen is displayed on the display unit 401 on the basis of the communication propriety with the monitoring server 102 and the occurrence accumulated count of the "error sign". That is, another method to request the maintenance from the allotted service department from a place other than the monitoring server 102 is provided. Thereby, even if the monitoring server is in the state where the occurrence of the abnormality-related alert of the "error sign" in the MFP 101 cannot be detected, the maintenance can be requested in the stage of the error sign.

Moreover, in the above-mentioned processes in FIG. 8 and FIG. 11, when the communication with the monitoring server 102 is unavailable and when the occurrence accumulated count of the "error sign" is equal to or more than the predetermined count, the warning screen 1000 is displayed on the display unit 401. That is, another method to request the maintenance from the allotted service department from a place other than the monitoring server 102 before the occurrence of the "error stop" is provided. Thereby, even if the communication with the monitoring server 102 is unavailable, the maintenance can be requested before occurrence of an error.

Furthermore, in the above-mentioned processes in FIG. 8 and FIG. 11, when the communication with the monitoring server 102 is unavailable and when the "error sign" occurred a plurality of times within 24 hours, the warning screen 1000 is displayed on the display unit 401. When the abnormality-related alert of the "error sign" occurs a plurality of times within 24 hours, the MFP 101 is not in the "error stop" state but in a state where the maintained is needed. In such a case, it is preferable to request the maintenance from an allotted service department immediately. In the meantime, since the monitoring server 102 cannot detect the abnormality-related alert of the "error sign" occurred in the MFP 101 when the communication with the monitoring server 102 is unavailable, it is necessary to provide another method to request the maintenance from the allotted service department from a place other than the monitoring server 102. Against this, in the embodiment, when the communication with the monitoring server 102 is unavailable and when the abnormality-related alert of the "error sign" occurred a plurality of times within 24 hours, the warning screen 1000 is displayed on the display unit 401. Thereby, even if the communication with the monitoring server 102 is unavailable, the maintenance can be requested at a suitable timing when the maintenance is needed.

In the above-mentioned processes in FIG. 8 and FIG. 11, the case where the communication with the monitoring server 102 is unavailable include the case where the MFP 101 is not in the communicating state with the monitoring server 102. That is, the method to request the maintenance from the allotted service department from a place other than the monitoring server 102 is provided to the MFP that does not use the remote monitoring service. Thereby, the MFP that does not use the remote monitoring service is also able to request the maintenance in the stage of the error sign.

In the above-mentioned processes in FIG. 8 and in FIG. 11, when the communication with the monitoring server 102 is available, the warning screen is not displayed on the display unit 401. This enables to prevent the user who ascertained the warning screen from requesting the same content that is requested by the monitoring server 102.

Moreover, in the above-mentioned processes in FIG. 8 and FIG. 11, the "error sign" is the transfer alarm or the patch-inspection abnormality alarm. Accordingly, the maintenance can be requested before occurrence of the error relevant to the transfer alarm or the patch-inspection abnormality alarm.

Although the present invention is described with the embodiment mentioned above, the present invention is not limited to the embodiment mentioned above. For example, when the MFP 101 cannot communicate with the monitoring server 102, a message showing that the transmission of the alert information failed may be displayed on the status line part 1002 of the warning screen 1000. Thereby, the user is notified that the remote monitoring service is not functioning.

Moreover, although the predetermined count as the determination criterion in the step S202 is ten, and the determination criterion in the step S203 is three times or more within 24 hours in the above-mentioned embodiment, other values may be used as the respective determination criteria. For example, when the above-mentioned predetermined count is one, the maintenance of the MFP 101 by the service person is certainly performed in the stage of the error sign, which prevents the error stop as much as possible.

In the above-mentioned embodiment, the error signs may include a consumable-item-life sign that suggests that life of a consumable item, such as developer or a developer recovery container, that is used for the image forming process of the MFP 101 will exhaust in the near future. The consumable-item-life sign is determined by whether consumed volume exceeds a threshold that is set up by the manager of the MFP 101 arbitrarily through the operation unit 310.

Figure 12:
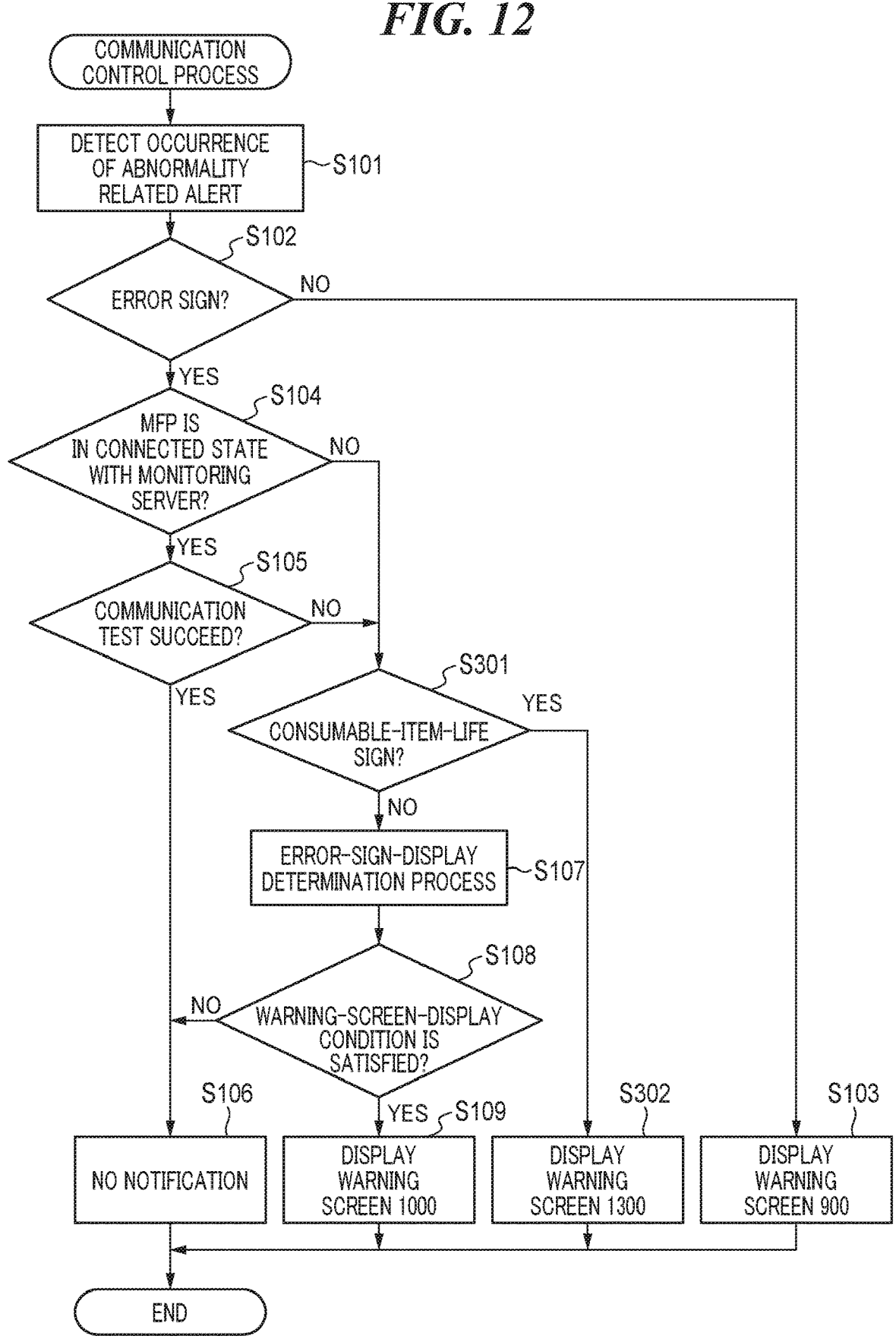
FIG. 12 is a flowchart showing procedures of a modified example of the communication control process in FIG. 8.

FIG. 12 is a flowchart showing procedures of a modified example of the communication control process in FIG. 8. The process in FIG. 12 is also executed when the CPU 301 runs a program stored in the HDD 303. The process in FIG. 12 is also executed when the abnormality-related alert occurs in the MFP 101.

As shown in FIG. 12, the CPU 201 first executes the process in the steps S101 through S104. As a result of the determination in the step S104, when the MFP 101 is in the communicating state with the monitoring server 102, the CPU 301 executes the process in step S105.

As a result of the determination in the step S105, when the communication test of the monitoring server 102 is succeeded, the CPU 301 executes the process in and after the step S106. When the communication test of the monitoring server 102 failed as a result of the determination in the step S105 or when the MFP 101 is not in the communicating state with the monitoring server 102 as a result of the determination in the step S104, the CPU 301 determines whether the occurred abnormality-related alert is the consumable-item-life sign (step S301).

Figure 13:
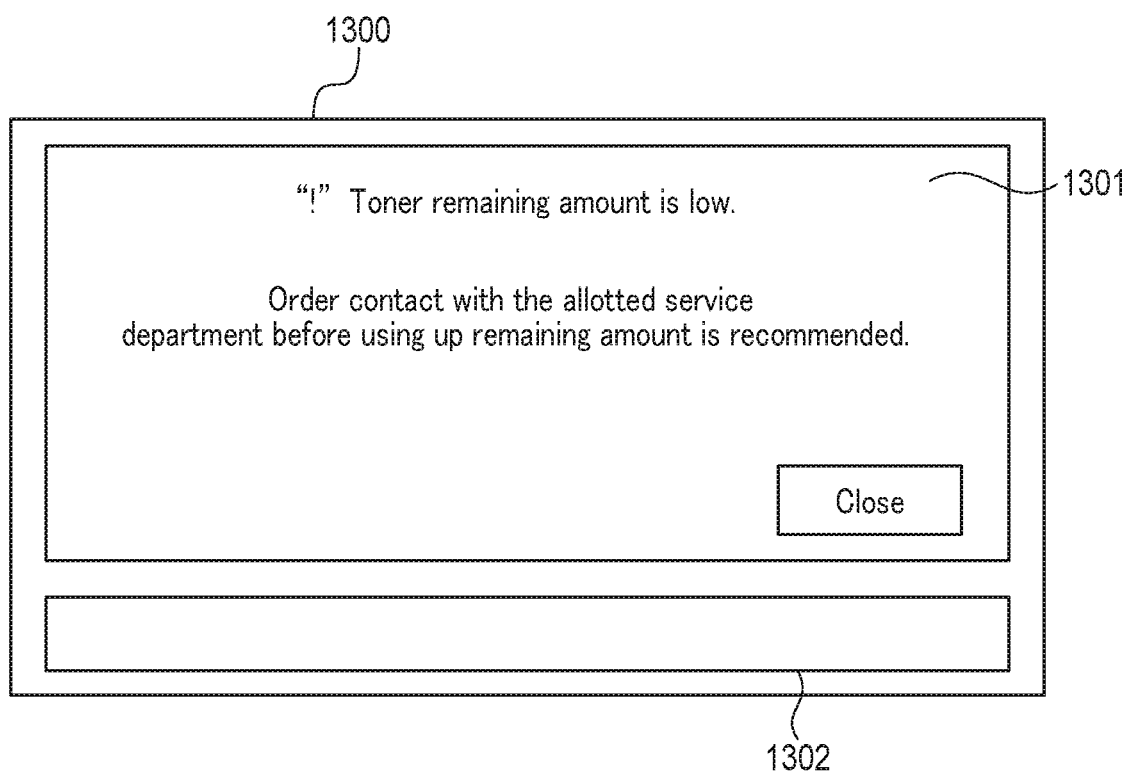
FIG. 13 is a view showing an example of the warning screen displayed on the display unit during the process in step S202 in FIG. 12.

As a result of the determination in the step S301, when the occurred abnormality-related alert is the consumable-item-life sign, the CPU 301 displays a warning screen 1300 shown in FIG. 13 on the display unit 401 as notification to the user (step S302). The warning screen 1300 includes a message 1301 that prompts contact with the allotted service department to order the consumable item that is subjected to replacement. Moreover, since the CPU 301 is incommunicable with the monitoring server 102 and cannot send the alert information to the monitoring server 102, the message showing that the alert information has been sent is not displayed in a status line part 1302 of the warning screen 1300. Then, the CPU 301 finishes this process.

In the above-mentioned process in FIG. 12, the error sign includes the consumable-item-life sign showing that life of a consumable item used in the MFP 101 will exhaust in the near future. Thereby, even if the monitoring server cannot detect that life of a consumable item will exhaust in the near future, the maintenance can be requested before the life of the consumable item exhausts.

Moreover, in the above-mentioned process in FIG. 12, when the consumable-item-life sign is detected, the warning screen 1300 is displayed on the display unit 401. This enables the user to find out that the consumable item should be ordered before the life of the consumable item exhausts.

Furthermore, in the above-mentioned process in FIG. 12, the threshold for the consumed volume about the consumable items for detecting the consumable-item-life sign is set up by the manager of the MFP 101. Thereby, the suitable threshold is set up depending on the use situation of the MFP 101 so that the maintenance will be requested before the life of the consumable item exhausts.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-028879, filed Feb. 21, 2018 and NO. 2018-211554, filed Nov. 9, 2018, which are hereby incorporated by reference herein in their entireties.

What is claimed is:

1. An printing apparatus that is capable of performing a print function and is connectable with an information processing apparatus that is capable of providing a remote monitoring service to the printing apparatus, the printing apparatus comprising:
a memory configured to store instructions; and
processing circuitry configured to execute the instructions stored in the memory to cause the printing apparatus to implement:
an error sign detection unit configured to detect an error sign in the printing apparatus;
a sending unit configured to send alert information corresponding to the error sign detected by the error sign detection unit to the information processing apparatus; and
a display control unit configured to display a notification screen corresponding to the error sign detected by the error sign detection unit on a display unit of the printing apparatus,
wherein the display control unit displays the notification screen on the display unit with the print function being available in a case where the error sign in the printing apparatus is detected by the error sign detection unit and communication between the printing apparatus and the information processing apparatus is not possible, and
wherein the display control unit does not display the notification screen on the display unit with the print function being available in a case where the error sign in the printing apparatus is detected by the error sign detection unit and the communication between the printing apparatus and the information processing apparatus is possible.

2. The printing apparatus according to claim 1, wherein the display control unit displays the notification screen on the display unit in a case where the communication between the printing apparatus and the information processing apparatus is not possible, even if the remote monitoring service provided by the information processing apparatus is activated.

3. The printing apparatus according to claim 1, wherein the error sign detection unit detects the error sign by detecting a transfer alarm that occurs during execution of an image forming process or a patch-inspection abnormality alarm.

4. The printing apparatus according to claim 1, wherein the error sign detection unit detects the error sign by detecting a consumable-item-life sign showing that life of a consumable item used in the printing apparatus will exhaust in near future.

5. The printing apparatus according to claim 4, wherein the display control unit displays, on the display unit, a notification that prompts a user to order the consumable item in a case where the consumable-item-life sign is detected.

6. The printing apparatus according to claim 4, wherein a threshold for consumed volume about a consumable item for detecting the consumable-item-life sign is configured to be set up by a user of the printing apparatus.

7. An printing apparatus that is capable of performing a print function and is connectable with an information processing apparatus that is capable of providing a remote monitoring service to the printing apparatus, the printing apparatus comprising:
a memory configured to store instructions; and
processing circuitry configured to execute the instructions stored in the memory to cause the printing apparatus to implement:
an error sign detection unit configured to detect an error sign in the printing apparatus;

a count unit configured to count a number of times that the error sign detection unit detects an error sign; and
a display control unit configured to selectively display a notification screen corresponding to the error sign detected by the error sign detection unit on a display unit of the printing apparatus,
wherein the display control unit displays the notification screen on the display unit in a case where the remote monitoring service provided by the information processing apparatus is not activated,
wherein the display control unit does not display the notification screen on the display unit in a case where the remote monitoring service provided by the information processing apparatus is activated, and
wherein the display control unit does not display the notification screen on the display unit in a case where the number of times that the error sign detection unit detects an error sign is less than a predetermined number even if the remote monitoring service provided by the information processing apparatus is not activated.

8. A control method for a printing apparatus that is capable of performing a print function and is connectable with an information processing apparatus that is capable of providing a remote monitoring service to the printing apparatus, the control method comprising:
detecting an error sign in the printing apparatus;
sending alert information corresponding to the detected error sign to the information processing apparatus;
displaying a notification screen corresponding to the detected error sign on a display unit of the printing apparatus such that the notification screen is displayed on the display unit with the print function being available in a case where the error sign in the printing apparatus is detected by the error sign detection unit and communication between the printing apparatus and the information processing apparatus is not possible; and
not displaying the notification screen on the display unit with the print function being available in a case where the error sign in the printing apparatus is detected by the error sign detection unit and the communication between the printing apparatus and the information processing apparatus is possible.

9. A non-transitory computer-readable storage medium storing a control program causing a computer to execute a control method for a printing apparatus that is capable of performing a print function and is connectable with an information processing apparatus that is capable of providing a remote monitoring service to the printing apparatus, the control method comprising:
detecting an error sign in the printing apparatus;
sending alert information corresponding to the detected error sign to the information processing apparatus;
displaying a notification screen corresponding to the detected error sign on a display unit of the printing apparatus such that the notification screen is displayed on the display unit with the print function being available in a case where the error sign in the printing apparatus is detected by the error sign detection unit and communication between the printing apparatus and the information processing apparatus is not possible; and
not displaying the notification screen on the display unit with the print function being available in a case where the error sign in the printing apparatus is detected by the error sign detection unit and the communication between the printing apparatus and the information processing apparatus is possible.

* * * * *